United States Patent [19]
Mims

[11] Patent Number: 5,152,538
[45] Date of Patent: Oct. 6, 1992

[54] COMPOSITE SEAL ASSEMBLY

[75] Inventor: Steve A. Mims, Streamwood, Ill.

[73] Assignee: Chicago Rawhide Manufacturing Company, Inc., Elgin, Ill.

[21] Appl. No.: 462,994

[22] Filed: Jan. 8, 1990

Related U.S. Application Data

[63] Continuation of Ser. No. 171,014, Mar. 21, 1988, abandoned.

[51] Int. Cl.⁵ .............................................. F16J 15/32
[52] U.S. Cl. ............................... 277/35; 123/198 E;
277/153; 277/166; 277/183; 277/189; 277/DIG. 4
[58] Field of Search ........... 277/35, 152, 153, DIG. 4, 277/237 A, 181, 182, 183, 184, 189, 166; 123/198 E, 196 R

[56] References Cited

U.S. PATENT DOCUMENTS

| | | | |
|---|---|---|---|
| 2,436,612 | 2/1948 | Sheets | 277/152 X |
| 3,059,938 | 10/1962 | Hennessy | 277/DIG. 4 X |
| 3,601,417 | 8/1971 | Szepesuary | 277/153 X |
| 3,606,363 | 9/1971 | Jordan | 277/189 X |
| 3,837,660 | 9/1974 | Poggio | 277/153 X |
| 3,917,286 | 11/1975 | Loyd | 277/153 X |
| 4,125,266 | 11/1978 | Schonherr et al. | 277/153 |
| 4,232,872 | 11/1980 | Miyabara | 277/153 X |
| 4,489,751 | 11/1984 | Deuring | 277/153 X |
| 4,521,165 | 6/1985 | Ogawa | 123/198 E |
| 4,535,996 | 8/1985 | Cardis et al. | 277/166 X |
| 4,645,215 | 2/1987 | Fuchs et al. | 277/152 |
| 4,677,948 | 6/1987 | Candea | 123/196 R |
| 4,730,836 | 3/1988 | Miller et al. | 123/198 E |
| 4,799,691 | 1/1989 | Stritzke et al. | 277/DIG. 4 |
| 4,928,980 | 5/1990 | Deuring | 277/153 |

FOREIGN PATENT DOCUMENTS

| | | | |
|---|---|---|---|
| 43058 | 3/1982 | Japan | 277/153 |
| 86817 | 11/1957 | Netherlands | 277/153 |
| 2147666 | 5/1985 | United Kingdom | 277/153 |

Primary Examiner—Allan N. Shoap
Attorney, Agent, or Firm—James T. FitzGibbon; Angelo J. Bufalino

[57] ABSTRACT

A composite seal assembly which includes a retainer element, a retainer insert and an elastomeric sealing unit. The elastomeric sealing unit is bonded to the retainer insert and the retainer insert is thereafter secured in fluid tight relation to a circular opening within the retainer element. The elastomeric seal unit includes a primary lip with a seal band formed by convergent frusto-conical air and oil side sealing surfaces. The retainer element and the retainer insert are formed from resinous synthetic plastic materials and at least a portion of the retain element includes an end face for fluid tight engagement with an opposed end face of a machine part.

10 Claims, 3 Drawing Sheets

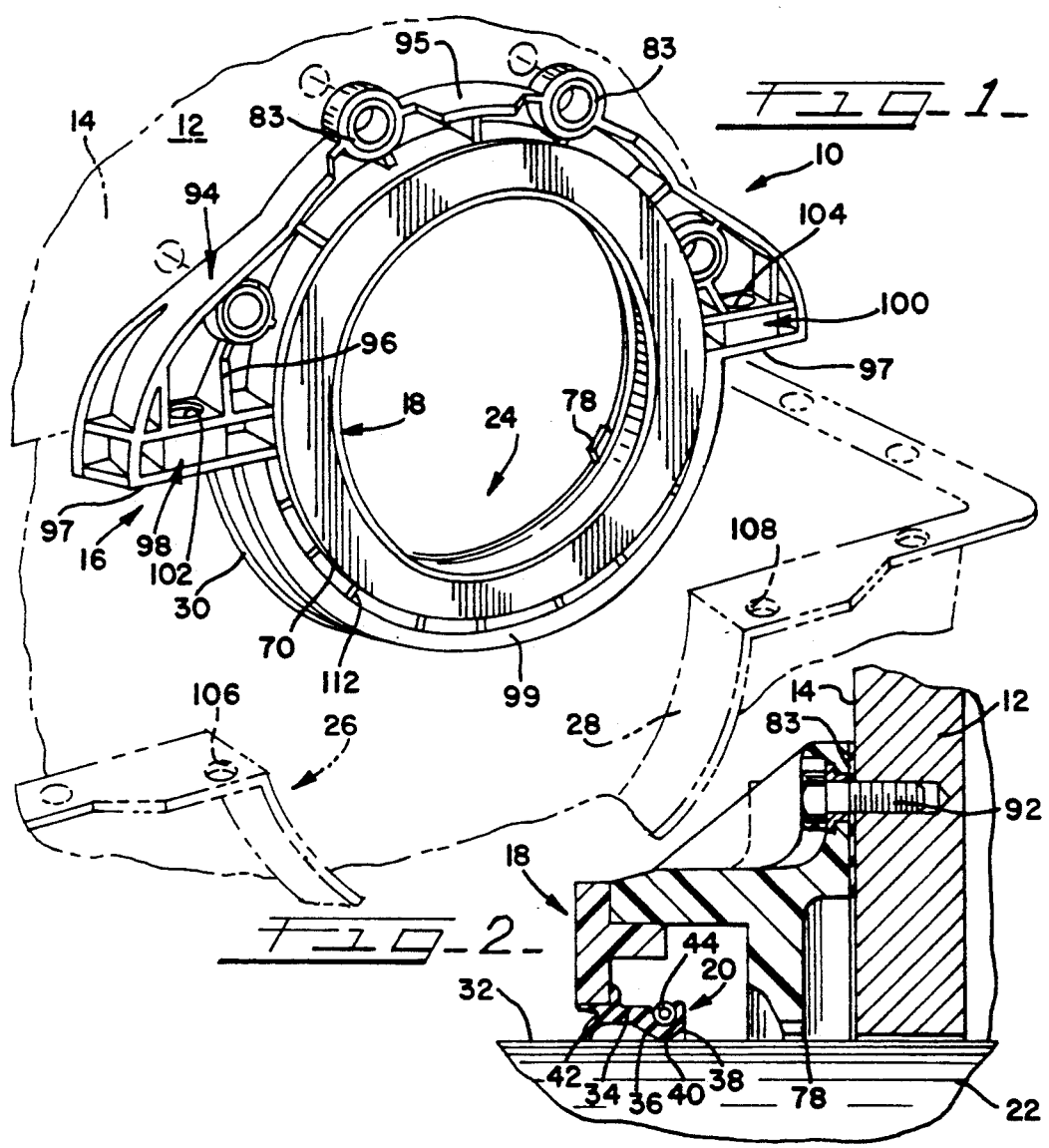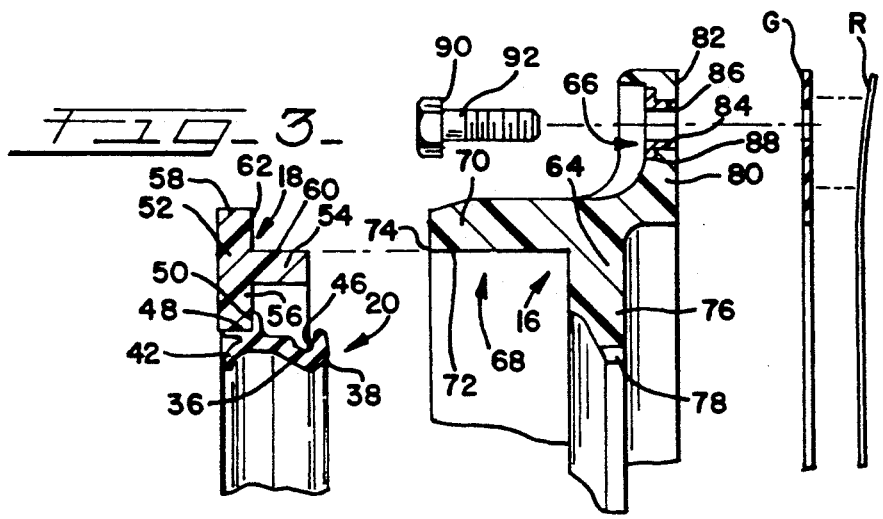

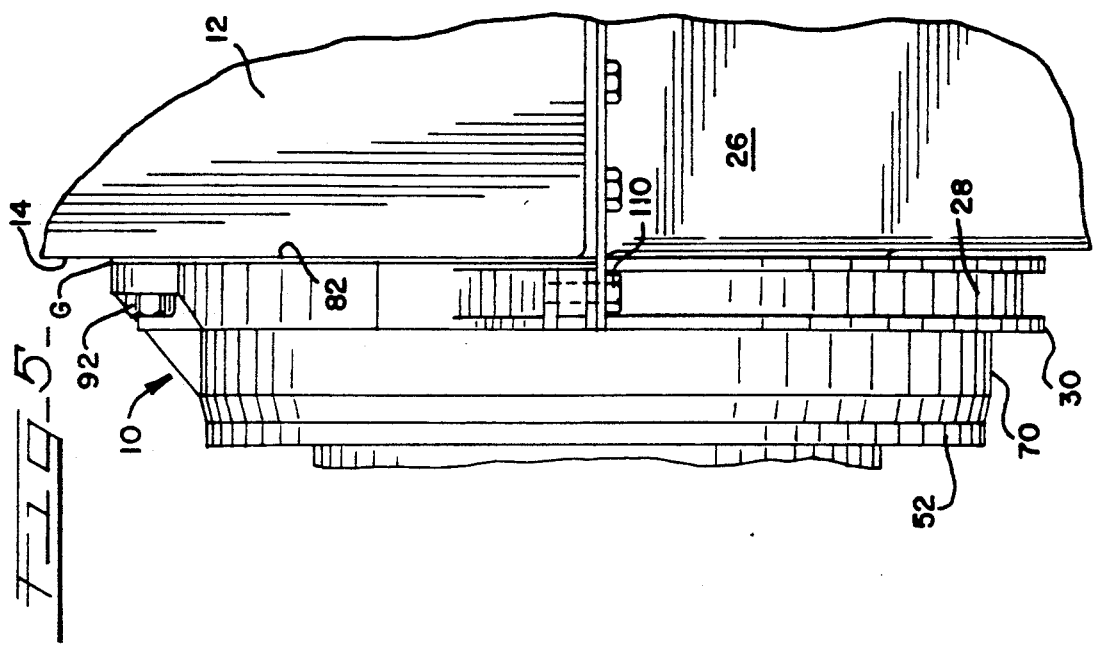
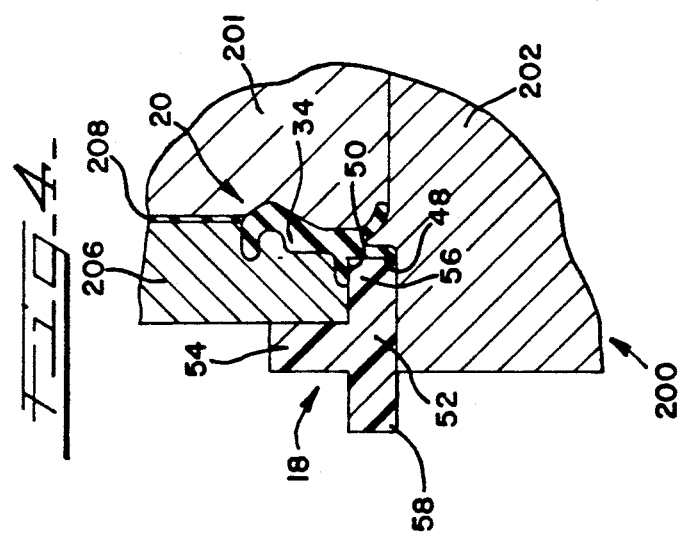

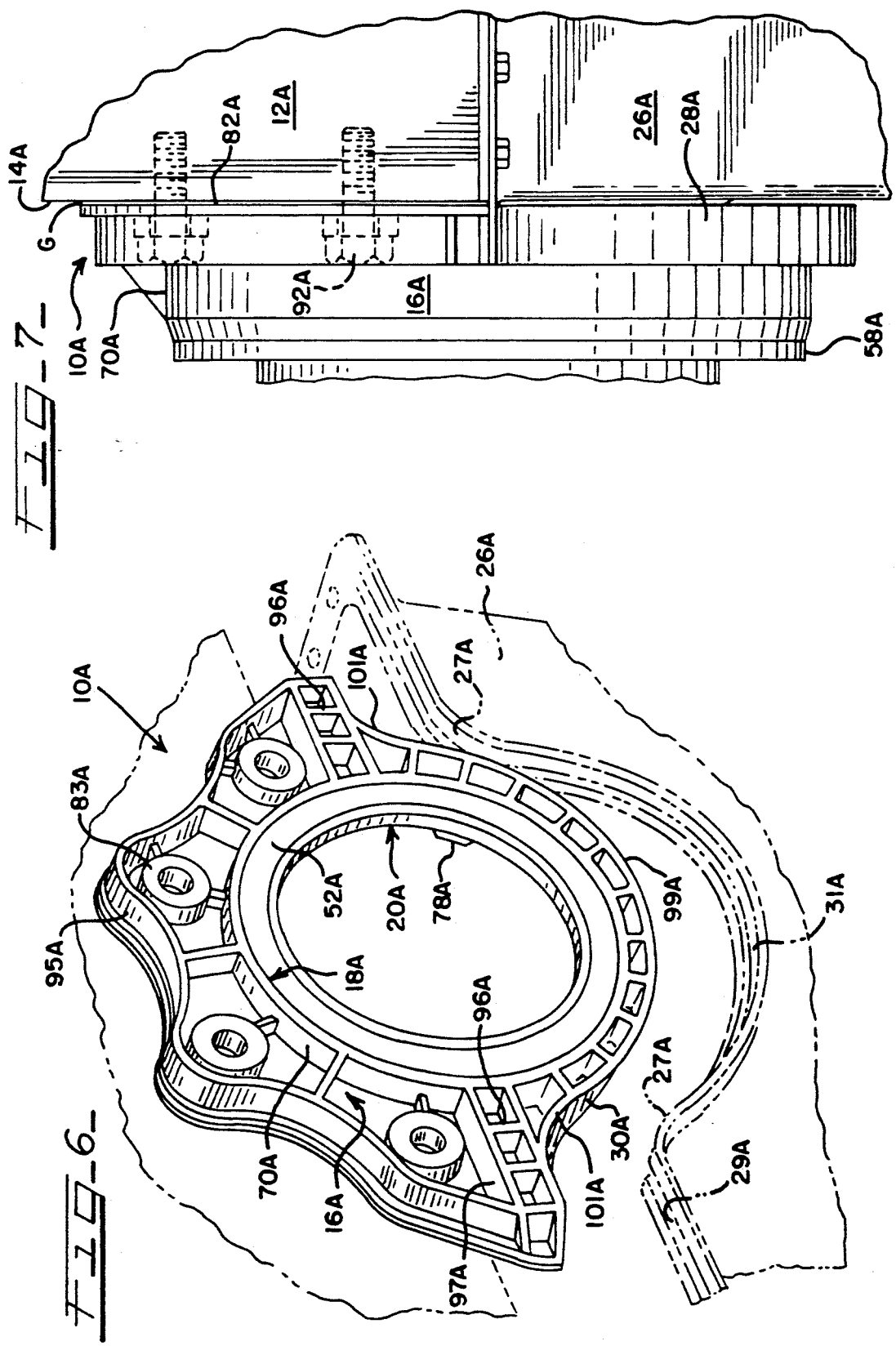

COMPOSITE SEAL ASSEMBLY this application is a continuation of application Ser. No. 171,014, filed Mar. 21, 1988, now abandoned.

BACKGROUND OF THE INVENTION

The present invention relates generally to oil seals, and more particularly, to a composite seal assembly adapted for specialized applications. According to the present invention, a novel form of seal is provided which makes possible the elimination of cumbersome, relatively unreliable former designs for certain special applications. In particular, the seal design of the present invention makes installation of rear crankshaft seals much easier and more reliable.

While the present invention has other applications, the primary application, that of a rear crankshaft seal, has historically presented a number of serious problems. In some engine designs, the portion of the crankshaft over which the lip of the oil seal is required to extend is a reduced diameter portion of the crankshaft. Accordingly, it was sometimes customary to wrap a rope-type packing around such reduced diameter crankshaft end portion. In other applications, the seal has been manufactured in two mating halves, and installation required not only positioning one of the seal halves in a narrow recess lying within a part of the engine block above the crankshaft bearing journal, but also required precise mating of the lower half of the seal with the upper half so that there was no leakage along the surfaces at which the two half seals met in end-to-end relation. In addition, it was often difficult to align the seal so that the seal lip would lie in a single plane to provide an effective seal. In many cases, these problems were aggravated because the material used to form the seal lip was one which lacked mechanical strength and toughness; silicone rubbers for example, were often used in this application. This made a good seal between seal halves but the material lacked toughness and could be damaged during installation.

Another problem common not only to rear crankshaft applications but to seal installations generally, is the matter of quality control under conditions where part of the seal assembly is made by one manufacturer and the other part or parts are made by one or more other manufacturers. This situation may be aggravated where installation is done by assembly line personnel who represent a still further element in the assembly process. Modern quality assurance concepts call for placing the responsibility for an assembled element with a single person or source, where possible. Accordingly, any arrangement wherein different elements of an assembled part are supplied from different sources or are assembled by different personnel create situations wherein it is difficult to maintain quality, and to pinpoint responsibility in the event of failure.

According to the present invention, a seal assembly can be provided which eliminates the need to machine a counterbore in the end of the engine block. This operation may thus be eliminated.

The present invention provides a composite seal which insures easy alignment and ready fastening to a flat face portion of an engine block or related part. Moreover, the invention provides a retainer element which may be made from a synthetic plastic material at low cost, to close tolerances, and which is susceptible of receiving and precisely locating a retainer insert which in turn carries an elastomeric seal body. The invention is particularly compatible with modern manufacturing techniques, and has a number of incidental advantages as well.

In its preferred form, the invention provides a crankshaft seal assembly which includes a molded plastic retainer element having fastener inserts received therein and which further includes a shoulder surface arrangement for receiving and positioning a retainer insert which may be affixed by ultrasonic welding or the like in fluid tight relationship to the retainer.

The insert carries a fluoroelastomer or similar tough, high temperature resistant seal unit which directly engages a surface on a portion of the crankshaft or a similar surface to be sealed. Still further, according to the invention, the retainer itself includes, in addition to a mounting portion, a portion encircling the rear crankshaft extension, an outer surface adapted to be engaged in fluid-tight, static relation by the engine oil pan. This further simplifies and improves the reliability of installation. The present invention provides these and a number of other advantages, including the advantages of enabling an elastomeric seal unit body of small volume to be made available for this installation.

In view of the failure of the prior art to provide a fully satisfactory, economical and reliable rear crankshaft seal, it is an object of the present invention to provide an improved composite seal assembly.

Another object of the invention is to provide a composite seal assembly which includes three separate elements which are combined by the manufacturer into a unitary, easy-to-install assembly.

A still further object of the invention is to provide a composite seal assembly which includes a retainer element molded from a plastic material, a retainer insert unit which is affixed in fluid tight relation to a center opening in the retainer element, and an elastomeric seal unit which is bonded to one or more selected surfaces of the retainer insert and which engages a movable machine part extending through the center seal opening.

Yet another object of the invention is to provide a composite seal element whose components may be manufactured with minimum tooling expense and at low cost using high volume molding techniques.

A further object of the invention is to provide a multi-part seal whose elements may be assembled under the control of a single manufacturer.

A still further object of the invention is to provide a composite seal assembly which is readily aligned and positioned relative to a fixed machine member, with a portion of the assembly encircling a relatively movable machine member and which composite seal may be reliably installed without damage in a predetermined position of use.

Another object of the invention is to provide a seal which readily mates in fluid tight relation with other parts, including a movable machine member and a pair of stationary machine members.

A further object of the invention is to provide a seal assembly wherein one of the elements may be affixed in a precise relation to another by ultrasonic welding techniques.

A still further object of the invention is to provide a composite seal assembly wherein two of the components are made from different thermoplastic, injection molded materials, one of which is readily insert molded with and bonded to an elastomeric seal unit.

Yet another object of the invention is to provide a method of manufacturing an improved seal to provide a sealed mechanism which includes at least one stationary part and at least one movable machine member and in which the fluid is confined to the interior of the sealed mechanism by a composite seal unit which includes a pair of relatively rigid plastic elements and a bonded elastomeric seal unit.

Another object of the invention is to provide a multi-element seal unit which is resistant to damage during installation, resistant to fatigue in use, and which will assure proper alignment and positioning relative to both fixed and movable elements.

A still further object of the invention is to provide a seal assembly which eliminates the need for performing certain finishing operations on the remainder of the seal unit.

The foregoing and other objects and advantages of the invention are achieved in practice by providing a composite seal unit which includes a retainer element adapted to be affixed to a machine member in fluid tight relation, with the retainer element including a center opening having means for receiving a retainer insert, a retainer insert positioned within said opening both radially and axially in a desired position of use, with the insert having an elastomeric seal body bonded to a portion thereof in fluid tight relation and with the seal body including frusto-conical surfaces meeting each other to define a seal band along a generally circular locus to provide a seal band of intended contact with a relatively movable machine element extending outwardly from the first unit. The invention is also achieved in practice by providing such an assembly having the retainer and the retainer insert made from synthetic plastic materials, and by providing methods and apparatus for making such a seal assembly.

The exact manner in which the foregoing and other objects and advantages of the invention are achieved in practice will become more clearly apparent when reference is made to the following detailed description of the preferred embodiments of the invention set forth by way of example and shown in the accompanying drawings, in which like reference numbers indicate corresponding parts throughout.

BRIEF DESCRIPTION OF THE DRAWINGS

FIG. 1 is a perspective view of the composite seal of the invention, showing it in a position of use as a rear crankshaft seal showing an associated engine crankcase and crankcase oil pan in phantom lines;

FIG. 2 is a fragmentary vertical sectional view of a portion of the composite oil seal unit of the invention, showing the same in position of use and showing the fixed and movable machine elements relative to which it is intended to form a seal;

FIG. 3 is a view showing the elements of FIG. 2 in their exploded or pre-assembled relation;

FIG. 4 is a vertical sectional view, partly diagrammatic in nature, showing the manufacture of the retainer insert and the elastomeric sealing units of the invention;

FIG. 5 is a side elevational view of the seal assembly of the invention, showing it in association with other portions of the sealed mechanism;

FIG. 6 is a perspective view of a modified form of composite seal unit of the invention; and, FIG. 7 is a side elevational view of the composite seal of the invention and the installed position of use.

DESCRIPTION OF THE PREFERRED EMBODIMENTS OF THE INVENTION

While the assembly of the invention is capable of use in a number of environments, and is adapted for a number of applications, a detailed description of two different forms of seal of the invention will be given, which versions differ slightly from each other and both of which are intended for use as a rear crankshaft seal assembly in an automotive engine application.

Referring now to the drawings in greater detail, FIG. 1 is a perspective view of a composite seal assembly generally designated 10 and shown to be positioned near a mounting surface 12 forming a part of a first machine element 14, which it is intended to be associated in use.

The composite seal assembly 10 includes three principal elements, which are shown in FIGS. 1-3; these include a retainer element generally designated 16, a retainer insert generally designated 18, and an elastomeric sealing unit generally designated 20. In the application considered, the first machine element 14 is an automotive engine block; and the mounting surface 12 forming the rear end face surface of the block.

A rear crankshaft extension 22 (FIG. 2) forms a second machine element and the extension 22 protrudes through a center opening generally designated 24 in the seal assembly 10. An engine oil pan generally designated 26 forms the third machine element; the pan 26 is shown in phantom lines to have surface portions 28 which engage a partially cylindrical lower exterior surface 30 of the retainer element 16.

The crankshaft or crank extension 22 has a cylindrical exterior wear surface 32 over which a portion of the elastomeric seal unit 20 rides in fluid tight relation. The seal unit 20 itself is of generally conventional construction insofar as it includes an elastomeric seal body 34 having air and oil side, generally frusto-conical surface portions 36, 38 which meet along a generally circular locus to form a seal band 40; this is the portion that engages the surface 32 with what is termed a dynamic seal, i.e., a seal between relatively movable elements.

The seal body 34 may optionally include an excluder or dirt lip 42, also of a conventional construction known to those skilled in the art. A garter spring 44 is shown to be received in a groove 46 (FIG. 3) for imposing a radial compressive load on the seal lip or band 40. The seal body 34 also includes a pair of bonding surfaces 48, 50 of annular form, spaced from the seal band 40, and along which the seal body 34 is attached to the retainer insert 18.

The insert unit 18 itself is also of generally annular form and includes a body portion 52 with an axially extending flange 54, a radially inwardly extending seal body mounting flange 56 and a radially outwardly extending locating flange 58. The axial flange 54 and the radially outwardly extending flange 58 respectively include surfaces 60, 62 which are adapted to engage oppositely directed counterpart surfaces on the retainer element 16 in a mechanically secure, fluid-tight relation. As is discussed in greater detail below, the annular retainer insert 18 is preferably made from a synthetic plastic material.

Referring now to the retainer element 16, this unit includes a main body portion 64 also preferably made from a thermoplastic material; the element 16 may be considered from a functional shank part as having a mounting portion generally designated 66 and an insert receiving portion 68. The body 64 includes an axial flange 70 having a radially inwardly facing cylindrical surface 72 for engaging the surface 60 of the insert flange 54 and an end face or shoulder surface 74 is provided on the flange 70 for engaging the surface 62 on the insert radial flange 58. In use, these abutting pairs of surfaces form fluid-tight joints in the assembled condition of the seal assembly 10.

The body 64 of the retainer 16 further includes a radially inwardly extending protective flange 76, which terminates in three or more individual tab units 78. This flange 76 lies axially inwardly of the seal unit 20, i.e., toward the sealed region or to the right in FIGS. 2 and 3.

Referring now to the mounting portion 66 of the composite seal unit 10, this portion is shown to include a mounting body 80 having a flat end face surface 82 adapted to abut the crankcase end face surface 14. A gasket "G" (FIG. 3) may be provided for improved sealing in this area. The retainer body 80 also includes a plurality of spaced apart formed fastener bosses 83, each having an axially extending opening 84.

The openings 84 receive metal insert sleeve 86 in snug relation; the preferred form of insert sleeve 86 includes a radial flange 88 thereon for engaging the undersurface 90 of the cap screw fastener 92 which extends through the central opening in the insert sleeve 86. In this manner, the fasteners 92 "bottom out" on the metal insert sleeve 86 which extends between the end face surface 14 of the engine block 12 and the undersurface 90 of the fastener head.

As shown in FIG. 1, the mounting portion 80 preferably includes a peripheral stiffening wall generally designated 94 and subdivided into an upper wall unit 95, a pair of lateral stub walls 97, and a semicircular lower wall 99. A plurality of individual stiffening webs 96, extend between the upper wall unit 95 and the flange 70 as well as between parts of the bosses 83 and flange 70 or wall 95. The stub walls 97 form parts respectively of left and right hand transverse mounting body extensions generally designated 98, 100, each of which is shown in FIG. 1 to be provided with a vertically extending passage 102, 104. The passages receive fasteners extending respectively through the openings 106, 108 in the oil pan 26.

In this connection, and referring again to FIG. 1, it will be realized that once the retainer unit 16 is snugly bolted to the crankcase, the oil pan may then be affixed not only to the underside surfaces of the crankcase in a conventional manner but that other fasteners may extend through the pairs of openings 106, 102, 100, 108, to secure the parts in fixed relation. In this instance, captive nuts or other fasteners may be provided for the passages 102, 104, or tapped inserts may be used, as indicated.

FIG. 1 also shows that a plurality of webs 112 extend between the lower surfaces of the retainer axial flange 70 and the semicircular lower wall 99 of the retainer element 16. These webs, walls and bosses provide a stiff construction at minimum weight and are consistent with high volume manufacture using relatively simple molds.

Referring now to FIG. 5, the composite seal 10 is shown in the installed position. Here, a fastener 92 is shown extending through the fastener boss 83 so that the end faces 14, 82 of the crankcase and retainer element respectively are shown in abutting relation. For clarity of illustration, the gasket "G" is not shown. FIG. 5 shows one of a pair of vertically extending fasteners 110 which hold the oil pan 26 to the stub walls 97 of the retainer unit 18.

Referring now to FIG. 6, a slightly modified form of seal assembly 10A is shown. The assembly is the same as that shown in FIGS. 1-3 except that the retainer element generally designated 16A in FIG. 6 differs slightly from the retainer element 16 in FIG. 1. In the form shown in FIG. 6, the upper wall unit 95A is continuous and lies entirely radially outside the various fastener bosses 83A.

Additional stiffening webs 96A extend between pairs of lateral stub walls 97A and the semicircular lower wall 99A includes rounded transition sections 101A at its upper ends rather than having upper ends which abut the stub walls at right angles. No auxiliary or vertical fasteners or openings therefore are required to affix the oil pan 26A. In this connection, it will be noted that the mating surface 28A of the oil pan 26A is contoured so as to having flaring transition sections 27A to mate with counterpart sections 101A on the outer ends of the lower exterior wall 99A. In the embodiment shown, a groove 29A is provided in the oil pan mating surface 28A to receive a gasket 31A to seal the interface between the surfaces 28A and 30A.

FIG. 7 shows the seal assembly 10A in the installed position of use, showing the relation of the engine block 12A, the abutting surfaces 14A, 82A on the engine block or first machine member 12A, the retainer unit 16A and the gasket "G." Fasteners 92A are shown in phantom lines. The engine oil pan 26A and its flange 28A which engages the lower exterior surface 30A of the lower wall 99A of the retainer unit 16A, are illustrated, as is the axial flange 70A of the retainer element 16A, the radial flange 58A of the insert 18A, for example.

Referring now to FIG. 4, there is shown one step in the operation of manufacturing the composite seal which precedes the assembly step shown in FIG. 3. Here, in FIG. 4, the retainer insert 18 is shown disposed within a mold generally designated 200 and shown to include three principal elements, a lower mold plate 202, a center core 204, and an upper insert 206. In this form of the invention, the retainer insert 18 is formed from a plastic material by injection molding in a mold with a suitably shaped cavity so as to provide the body 52 with the axial flange 54, the seal body mounting flange 56, and the locating flange 58.

After formation of the insert 18, the exterior surfaces of the flange 56 are degreased and grit blasted so as to impart a slightly roughened finish thereto. In the alternative, surface roughness may be imparted by chemical etching or by providing rough surfaces on selected portions of the mold interior. In any case, after surface preparation is complete, an adhesive of a type known to those skilled in the art is applied and allowed to dry. Thereafter, the retainer insert body 52 is placed in the mold 200 as illustrated, and rubber may be injected, as through passage 208, into the cavity formed by the inwardly directed surfaces of the mold parts 202, 204, 206. The in-place formation of the seal body 34, its initial curing and bonding to the radial flange 56 are carried out in a manner known to those skilled in the art and which, forming no part of the invention which is novel per se, is not herein described in further detail.

Assuming that the seal body is made from a fluoroelastomer material, after the mold shown in FIG. 4 is opened, and the part removed, the composite part comprising the elastomeric seal body 20 and the retainer insert 18 is post cured at an elevated temperature, such as 400° F., for 10 hours. This produces a completed, cured subassembly shown in FIG. 3.

Referring now to FIG. 3, there is illustrated the alignment and positioning of the retainer element 16 and the retainer insert 18. When these parts are aligned as shown in FIG. 3 and then moved into an assembled relation, the various illustrated mating pairs of surfaces 60, 72, and 62, 74 are in snug engagement, thereby centering the insert relative to the retainer 16 and insuring the proper axial positioning of the insert 18. Thereupon, the parts may be bonded by well-known ultrasonic welding techniques, with or without the aid of auxiliary adhesives or similar materials. In appropriate cases, the bonding may be achieved by adhesives only.

When molding and assembly operations have been completed, a seal of the kind illustrated in FIG. 2, for example, has been produced and is suitable for shipment to the manufacturer.

As pointed out above, the installation of the seal is then a matter which requires relatively little skill and no post finishing or machining on the machine parts in question, that is, the engine block, crankcase oil pan or the like. The retainer may be positioned as shown in FIG. 1, with the gasket "G" disposed between the face 14 on the engine block and the front or axially inner surface 82 on the retainer unit 16.

In one embodiment of the invention, the gasket "G," while manufactured separately, may be bonded to the retainer surface at the seal making factory, and the gasket may then have its other surface covered protectively by a release paper "R," for example, (FIG. 3) for shipping. The outer, covered face may or may not also have a self-adhesive material affixed thereto. In such case, only surface preparation of the block is necessary, because the seal includes its own gasket and gasket adhesive.

The alignment and fastening of cap screws 92 or the like insures proper alignment of the seal with the rear crankshaft extension, while the tab units 78 on the protective flange 76 insure that the radial excursion of the elastomeric seal unit 20 is limited and thus not damaged during installation. The plastic exterior surface 30 of the lower wall 99 mates in fluid-tight relation with the surface 28 on the oil pan 26, customarily sealed by a part of the oil pan gasket.

Because of the overall rigidity of the retainer 16, relatively high static sealing forces may be applied to the assembly 10 without detrimental affect; if this force were placed on the exterior casing of an ordinary oil seal, distortion of the seal casing or other installation fault might result. The installation of the seal, according to the present invention, is greatly simplified, and greatly increased reliability is achieved.

According to the invention, thermoplastic materials are preferred for use in making the retainer and insert components of the invention. Both these elements may be made from the same material, or the two can comprise dissimilar materials. While many different materials are suitable, filled thermoplastic resins such as glass-filled nylon or other polyamide resins are suitable. High temperature resistant thermoplastics such as polycarbonates, acetals or other materials may also be used with success.

While ordinary elastomers such as nitriles, carboxylated nitriles, or silicone elastomers may be used in making the seal unit 20, the present invention advantageously uses fluoroelastomer materials which are very high temperature resistant. Accordingly, in use, the seal is effective where fluid temperatures attain a steady 250° F. and occasionally reach temperatures of 400° F. to 500° F.

The use of the ultrasonic welding techniques is an economical way to form a strong secondary or static seal between the retainer and the insert. This eliminates a potential prior art problem of a faulty secondary seal, i.e., the seal between the exterior of the seal casing and the main bearing web or similar part of the crankcase structure. Another important feature of the present invention is that proper alignment may be achieved without press fitting. Use of a bolt pattern on an exterior flat surface not only eliminates the likelihood of this misalignment, but permits a visual inspection to be made to verify proper fit; this was difficult or impossible with some prior art seals.

It will thus be seen that the present invention provides a number of advantages and characteristics including those pointed out above and others which are inherent in the invention. Preferred embodiments of the invention having been described by way of example, it will occur to those skilled in the art that variations in the exact form of seal and the materials used therein may be made without departing from the spirit of the invention or the scope of the appended claims.

I claim:

1. A composite seal assembly comprising, in combination, a retainer element, a retainer insert, and an elastomeric sealing unit, said retainer element including an insert mounting portion which includes a radially inwardly facing annular surface defining a center opening for receiving and radially positioning a part of said retainer insert, at least one annular shoulder surface for engaging and axially positioning another part of said retainer insert, said retainer element also having a retainer element mounting portion with a generally flat surface for positioning in opposed relation to an associated machine part to which said retainer element will be fastened in use, and means defining plural openings for receiving and positioning retainer element mounting fasteners, said retainer insert including axially and radially extending annular flanges for cooperative engagement respectively with said radially inwardly facing annular surface and said annular shoulder surface of said retainer element, said retainer insert further including an annular bonding surface, said radially extending flange of said retained insert extending radially outwardly of said axially extending flange of said retainer insert and radially outwardly of said radially inwardly facing annular surface on said retainer element, said elastomeric sealing unit including a bonding portion and a generally annular seal body which includes generally frustoconical oil and air side sealing element surfaces meeting each other along a generally circular locus to form a primary seal band area of intended contact with the surface of a relatively movable machine part extending axially through said seal body, said bonding portion being attached in fluid tight sealing engagement to said bonding surface on said retainer insert, said retainer element and said retainer insert each being formed from a resinous synthetic plastic material, with said seal assembly being adapted to be affixed in use to the end face of a machine part having said relatively movable machine part extending therefrom and adapted to be engaged by said elastomeric sealing element.

2. A composite seal assembly as defined in claim 1 wherein said mounting portion of said retainer element includes a plurality of metal guide inserts received respectively within said openings for said mounting fasteners, said metal inserts being sized so as to engage said fasteners and absorb at least a portion of the axial fastening load, whereby said load is not transmitted entirely to said mounting portion of said retainer element.

3. A composite seal assembly as defined in claim 1 wherein said bonding portion of said retainer insert comprises an annular, generally radially inwardly extending flange.

4. A composite seal assembly as defined in claim 1 wherein said retainer unit and said retainer insert unit are made from different thermoplastic materials.

5. A composite seal assembly as defined in claim 1 wherein said retainer element and said retainer insert unit are made from substantially identical plastic materials.

6. A composite seal assembly as defined in claim 1 wherein said retainer element mounting portion is constructed and arranged such that all of said openings for said mounting fasteners lie within an arc of not more than about 190°, measured from the middle of said center opening in said retainer element.

7. A composite seal assembly as defined in claim 1 wherein said retainer insert is affixed to said retainer element by a bond formed by ultrasonic welding.

8. A composite seal assembly as defined in claim 1 wherein said elastomeric sealing unit is made from a fluoroelastomer material.

9. A composite seal assembly comprising, in combination, a retainer element, a retainer insert, and an elastomeric sealing unit, said retainer element including an insert mounting portion which includes a radially inwardly facing annular surface defining a center opening for receiving and radially positioning a part of said retainer insert, at least one annular shoulder surface for engaging and axially positioning another part of said retainer insert, said retainer element also having a retainer element mounting portion with a generally flat surface for positioning in opposed relation to an associated machine part to which said retainer element will be fastened in use, and means defining plural openings for receiving and positioning retainer element mounting fasteners, said retainer insert including axially and radially extending annular flanges for cooperative engagement respectively with said radially inwardly facing annular surface and said annular shoulder surface of said retainer element, said retainer insert further including an annular bonding surface, said elastomeric sealing unit including a bonding portion and a generally annular seal body which includes generally frustoconical oil and air side sealing element surfaces meeting each other along a generally circular locus to form a primary seal band area of intended contact with the surface of a relatively movable machine part extending axially through said seal body, said bonding portion being attached in fluid tight sealing engagement to said bonding surface on said retainer insert, said retainer element and said retainer insert each being formed from a resinous synthetic plastic material, with said seal assembly being adapted to be affixed in sue to the end face of a machine part having said relatively movable machine part extending therefrom and adapted to be engaged by said elastomeric sealing element, said retainer element further including a generally radially inwardly extending retainer flange, said retainer flange lying axially between said radially inwardly directed annular surface of said retainer element and said generally flat surface of said retainer element mounting portion.

10. A seal assembly as defined in claim 9 wherein said radially inwardly extending retainer flange includes a plurality of radially inwardly extending ears circumferentially spaced apart from each other, said ears being adapted for engaging said relatively movable part adapted to extend through said seal assembly for positioning said composite seal assembly for installation.

* * * * *